(12) United States Patent
Cicchetti et al.

(10) Patent No.: US 7,602,772 B2
(45) Date of Patent: Oct. 13, 2009

(54) HIGH DENSITY OPTICAL NETWORK ACCESS SWITCH

(76) Inventors: Christopher J. Cicchetti, 2147 Avy Ave., Menlo Park, CA (US) 94025; Timothy M. Beyers, 1025 Hampshire St., Apt B., San Francisco, CA (US) 94110; Donald A. Blackwell, 19534 Vineyard La., Saratoga, CA (US) 95070; Stephen Nelson, 10201 Miller Ave., Cupertino, CA (US) 95014; Greta L. Light, 214 42$^{nd}$ Ave., San Mateo, CA (US) 94403

( * ) Notice: Subject to any disclaimer, the term of this patent is extended or adjusted under 35 U.S.C. 154(b) by 493 days.

(21) Appl. No.: 11/290,496

(22) Filed: Nov. 30, 2005

(65) Prior Publication Data

US 2007/0121649 A1    May 31, 2007

(51) Int. Cl.
*H04L 12/50* (2006.01)
*H04L 12/56* (2006.01)
(52) U.S. Cl. ........ 370/380; 370/419
(58) Field of Classification Search ......... 370/372–385, 370/400, 401, 419
See application file for complete search history.

(56) References Cited

U.S. PATENT DOCUMENTS

| | | | |
|---|---|---|---|
| 5,859,592 A * | 1/1999 | Carlin | 340/815.45 |
| 6,798,936 B2 * | 9/2004 | Sato | 385/16 |
| 7,013,058 B1 * | 3/2006 | Maheshwari | 385/16 |
| 7,136,584 B2 * | 11/2006 | Harada et al. | 398/15 |
| 7,215,666 B1 * | 5/2007 | Beshai et al. | 370/380 |
| 2002/0015551 A1 * | 2/2002 | Tsuyama et al. | 385/17 |
| 2003/0076563 A1 * | 4/2003 | Lemoff et al. | 359/158 |
| 2004/0151171 A1 * | 8/2004 | Lee et al. | 370/380 |
| 2005/0002386 A1 * | 1/2005 | Shiragaki | 370/380 |

OTHER PUBLICATIONS http://www.datacomsystems.com/products/switches/2x8rx.asp (Printed from website Dec. 2, 2005).

* cited by examiner

*Primary Examiner*—Hong Cho

(57) ABSTRACT

In one example, an optical network access switch includes independent first and second banks of individually selectable optical inputs, as well as independent first and second groups of individually controllable optical outputs. A first multiplexer is connected to the optical inputs of the first bank and the optical outputs of the first group, and a second multiplexer is connected to the optical inputs of the second bank and the optical outputs of the second group. Finally, a configuration interface communicates with the first and second multiplexers and receives a switching command which specifies the connection/disconnection of an optical output to/from an optical input.

20 Claims, 9 Drawing Sheets

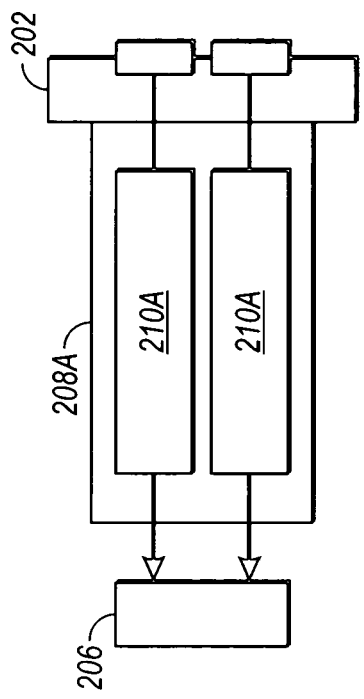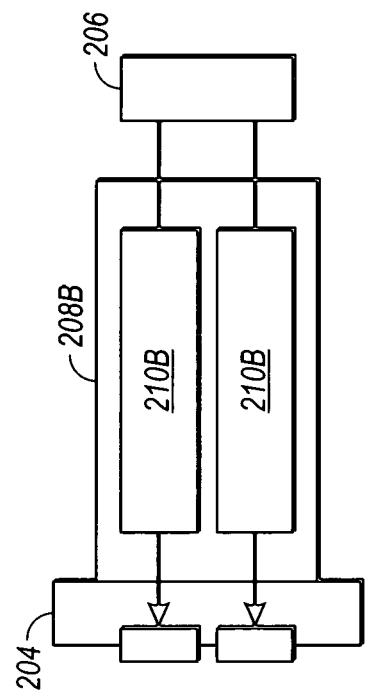

HIGH DENSITY OPTICAL NETWORK ACCESS SWITCH

BACKGROUND OF THE INVENTION

1. Field of the Invention

Exemplary embodiments of the invention generally relate to systems and devices for use in enabling the monitoring and analyzing of multiple ports of a data communication network.

2. Related Technology

The dependence upon the use of data networks to transmit and receive data at high data rates has led to a corresponding interest in the ability to perform real-time monitoring and analysis of that data, or network traffic, so that performance of the network can be evaluated, and problems identified and resolved. Such data monitoring and analysis necessitates the ability to access the network data stream without disrupting data transmission and the operation of the network.

To this end, hybrid network monitoring devices have been developed that include both a network test access point ("TAP") device, and an optical network access switch sometimes referred to as a "rover." In general, the TAP is a passive device that includes various connections by way of which a user can gain access to the network data stream for the purpose of performing monitoring and testing evolutions. The "rover" is an active device that interfaces with the TAP so as to monitor connections of the network in which the TAP/rover device is employed.

Typically, the hybrid device is employed in such a way that the TAP device is placed in-line with respect to the data stream. Because the TAP device is generally passive, the TAP is not prone to failure. In contrast with the relatively reliable TAP portion of the hybrid device however, the rover portion of the hybrid device has proven to be problematic.

In general, a failure or malfunction of the rover portion of the hybrid device can adversely impact the operation of the network to which the hybrid device is connected. More particularly, failure or malfunction of the rover portion typically requires that the entire hybrid device be disconnected from the network for repair or replacement. Since the hybrid device is typically employed in an in-line arrangement, disconnection of the hybrid device results in an interruption of network operations. In view of the heavy reliance on data communication networks, such network down time constitutes a significant problem.

In light of the problems associated with hybrid TAP/rover devices, many enterprise operations prefer to separate the TAP and rover functionalities from each other, so that even if the rover experiences a malfunction, the integrity of the network is not impaired. Accordingly, various rovers have been developed that are able to interface with, but which can be isolated from, associated TAP devices. Although such rovers represent an improvement in view of their lack of interdependence with TAP devices, these rovers nonetheless present problems of their own.

A significant problem with typical rovers relates to the transceivers and ports by way of which the rover communicates with the TAP and other devices. In particular, typical rovers include one transceiver connected to each port. Because typical rover ports are either input-only or output-only however, each transceiver that is connected to a port is not fully utilized. That is, for a transceiver connected to an input port of the rover for example, only the receive side of that transceiver will be utilized since the rover port is input-only, and the transmit side of that transceiver will be idle. Similarly, for a transceiver connected to an output port of the rover, only the transmit side of that transceiver that will be utilized since the rover port is output-only, and the receive side of that transceiver will necessarily be idle. Consequently, the purchaser of such rovers is compelled to pay for unused functionality.

Moreover, each dual rover input requires a pair of receivers, and each dual output port requires a pair of transmitters. That is, as noted above, typical rovers employ transceivers to implement the receive functionality at the rover, so that each dual input would accordingly require two transceivers. In the case of an input, the receive side of the first transceiver is then used on one side of the dual input, and the receive side of the second transceiver is used on the other side of that dual input. Thus, for each dual input of a typical rover, that rover includes a pair of unused transmitters. Similarly, in the case of an output, the transmit side of a third transceiver is then used on one side of the dual output, and the transmit side of a fourth transceiver is used on the other side of that dual output. Thus, for each dual output of a typical rover, that rover includes a pair of unused receivers. Such arrangements become increasingly problematic, both with respect to cost and complexity, as the number of rover inputs increases.

Yet another concern with typical rovers is that such devices are wavelength-specific. Thus, if a network optical signal has a wavelength that is different from the particular wavelength for which the rover is designed, the rover cannot process that signal. In view of the fact that typical data communication networks operate in connection with a variety of different optical wavelengths, the wavelength-specific nature of typical rovers is a signification limitation.

In order to overcome that limitation, users are typically compelled to use multiple rovers, each of which is compatible with one of the optical wavelengths of the communication network. This approach is a less than adequate solution because of the expense associated with the necessity of using multiple rovers, and because the use of multiple rovers greatly increases the cost and complexity of the installation. In another approach, enterprise personnel must employ one or more conversion devices to convert network optical signal wavelengths to a wavelength that can be used by an analyzer or monitoring device to which the rover is connected. Again, the use of such additional components increases the cost and complexity of the installation.

One further concern relating to the flexibility of many rover devices is that such devices typically are compatible with only a single protocol. This limitation sharply constrains the usefulness of such devices by requiring personnel to obtain a specific rover device for each protocol employed in the enterprise. The requirement for multiple devices, in turn, corresponds to a relatively higher cost to perform monitoring and analysis evolutions.

In view of the foregoing, it is clear that a need exists for devices and systems that address the aforementioned, and other, problems in the art.

BRIEF SUMMARY OF AN EXAMPLE EMBODIMENT

In general, embodiments of the invention are concerned with systems and devices for use in non-intrusive monitoring and analysis of multiple ports of a data communication network.

In one example embodiment, an optical network access switch is provided that includes independent first and second banks of individually selectable optical inputs, as well as independent first and second groups of individually controllable optical outputs. A first multiplexer is connected to the optical inputs of the first bank and the optical outputs of the first group, and a second multiplexer is connected to the optical inputs of the second bank and the optical outputs of the second group. Finally, a configuration interface communicates with the first and second multiplexers and receives a switching command which specifies the connection/disconnection of an optical output to/from an optical input.

The foregoing, and other, aspects of example embodiments of the invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1A is a detail view taken from FIG. 1 and disclosing an example arrangement of a receiver pair employed in connection with a dual input of an ONAS;

FIG. 1B is a detail view taken from FIG. 1 and disclosing an example arrangement of a transmitter pair employed in connection with a dual output of an ONAS;

DETAILED DESCRIPTION OF EXAMPLE EMBODIMENTS

As disclosed herein, exemplary embodiments of the invention are concerned with systems and devices for use in nonintrusive monitoring and analysis of multiple ports of a data communication network. More particularly, embodiments of the invention are concerned with a cascadable, high port density optical network access switch ("ONAS"), which may also be referred to herein as a "rover," that is compatible with multiple protocols and data rates. Example embodiments of the ONAS are connectable to TAP devices and can provide multiple dual network data signals to analyzers and other devices. In at least some embodiments, the ONAS is a portable device. As used herein, the "rover" terminology refers to the fact that the device can, among other things, rove among and monitor various ports of a data communication network.

I. Operating Environments

Embodiments of the invention are well suited for use in connection with the monitoring and analysis of Storage Area Networks ("SAN"s). However, the scope of the invention is not so limited and embodiments of the invention can be employed in connection with any other network or system where the functionality disclosed herein may prove useful.

Additionally, embodiments of the ONAS are compatible for use with various types of software, analyzers, and other devices. For example, some embodiments of the ONAS are compatible with Xgig products, such as analyzers, and software products such as NetWisdom. Communication between such exemplary ONASs and the NetWisdom and Xgig products is implemented via a 10/100 Ethernet connection of the ONAS. More generally however, embodiments of the invention can be configured and/or programmed to be used, and interface, with any of a variety of other software and devices, and the scope of the invention should not be construed to be limited to the examples disclosed herein.

Figure 1:
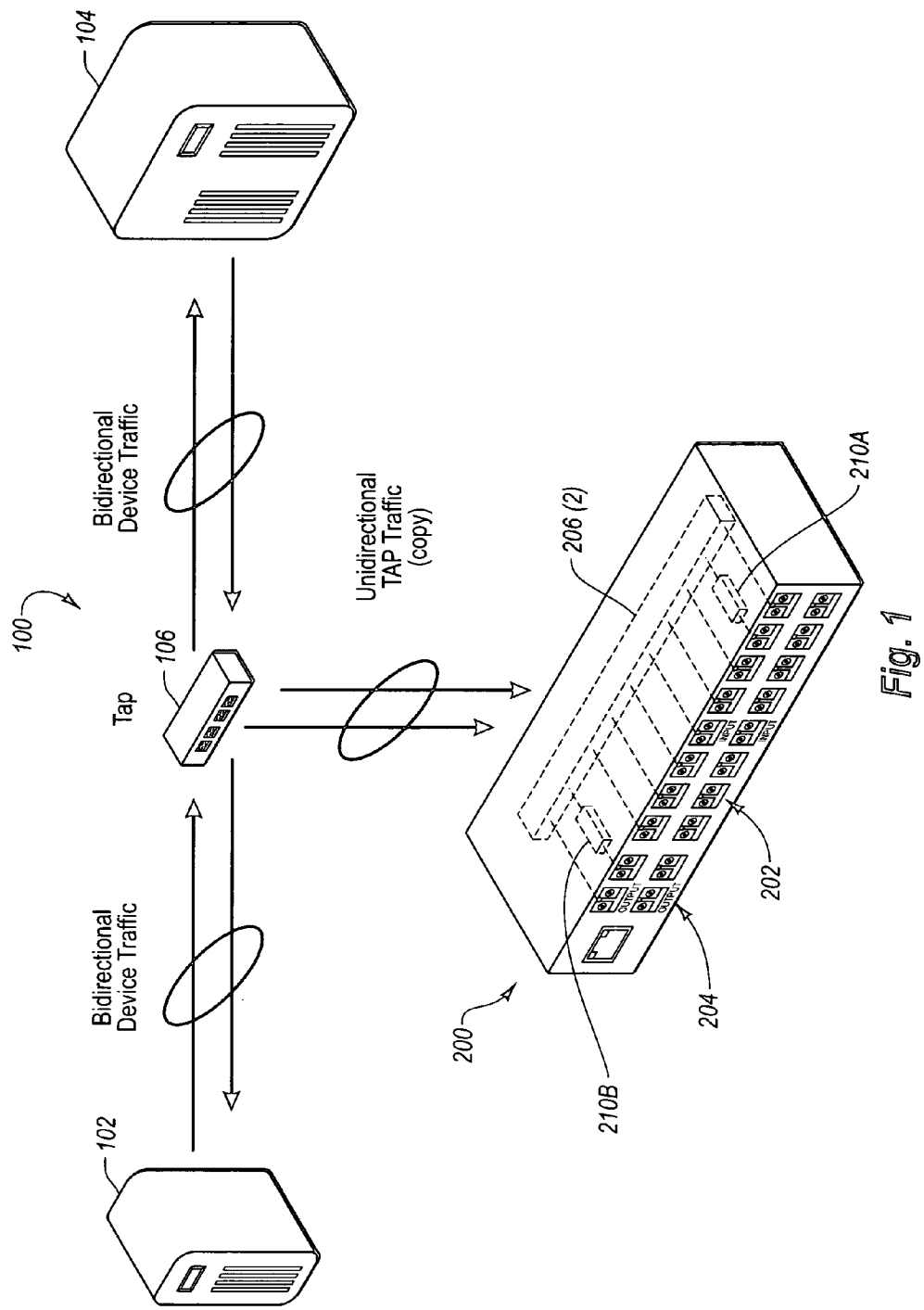
FIG. 1 is a schematic representation of an example operating environment where one or more ONASs may be employed.

Directing attention now to FIG. 1, details are provided concerning some aspects of one example of an operating environment in which one or more ONASs may be employed. In the illustrated example, the operating environment comprises a communication network, such as the optical communication network 100, that includes various devices, such as a server 102 and storage device 104 for example, between which data is communicated. In general, communication between the communication network 100 devices proceeds in a bidirectional fashion.

In order to aid in data stream monitoring and analysis evolutions, the optical communication network 100 further includes one or more test access point ("TAP") devices 106 which are positioned at one or more desired locations in the data stream. As disclosed in FIG. 1, one function of the TAP device 106 is to access the data stream and output a unidirectional copy of that data stream. The data stream copy provided by the TAP device 106 can then be used for monitoring and analysis processes, among other things.

Particularly, an ONAS 200 is provided that is arranged to receive the unidirectional output of the TAP device 106. In general, and as disclosed elsewhere herein, the ONAS 200 receives this unidirectional output and then directs that data stream to a monitor, analyzer and/or other devices by way of one or more outputs on the ONAS 200 (see, e.g., FIG. 2).

With continuing reference to FIG. 1, and directing attention as well to FIG. 1A, the example ONAS 200 comprises multiple dual inputs, designated generally at 202, divided into upper and lower independent sets. Each of the sets corresponds with a pair of dual outputs, where the dual outputs are designated generally at 204. A multiplexer 206 is provided for each of the upper and lower sets. The example ONAS 200 also comprises multiple receiver modules 208A. The receiver modules 208A conform with any desired form factor. In one embodiment, one or more of the receiver modules substantially conform with the SFF form factor. However, the scope of the invention is not limited to receiver modules conforming with any particular form factor.

The receiver modules 208A each include a pair of receive optical subassemblies ("ROSA") 210A. Each of the ROSAs 210A includes an optical receiver, such as a photodiode for example, and associated circuitry for operation of the optical receiver and for other operations of the ROSA 210A. The input side of each ROSA 210A is connected with a corresponding portion of a dual input 202, and the output side of each ROSA 210A is connected with the multiplexer 206. In one alternative embodiment, a single multiplexer is employed to perform multiplexing for multiple banks of the ONAS. In another embodiment, a single multiplexer is employed to perform multiplexing for all banks of the ONAS.

With continuing attention to FIG. 1, the example ONAS 200 also comprises multiple transmitter modules 208B. The transmitter modules 208B conform with any desired form factor. In one embodiment, one or more of the transmitter modules substantially conform with the SFF form factor. However, the scope of the invention is not limited to transmitter modules conforming with any particular form factor.

The transmitter modules 208B each include a pair of transmit optical subassemblies ("TOSA") 210B. Each of the TOSAs 210B includes an optical transmitter, such as a laser for example, and associated circuitry for operation of the optical receiver and for other operations of the TOSA 210B. The output side of each TOSA 210B is connected with a corresponding portion of a dual output 204, and the input side of each TOSA 210B is connected with the multiplexer 206.

As a result of the aforementioned example configuration of the ONAS 200, and as discussed in further detail below, the ONAS 200 is configured such that the multiplexer 206 is able, for a particular set of dual inputs 202, to connect any dual input 202 of that set with either, or both, of the pair of dual outputs 204 associated with that same set.

It should be noted that the foregoing discussion of the ONAS 200 is provided, in part, to facilitate the discussion of the example operating environment disclosed in FIG. 1. More particular details concerning some example ONAS implementations are provided herein in connection with the discussion of FIGS. 2-8.

II. General Aspects of an Example ONAS

Protocols and data rates—Exemplary ONASs are compatible with multiple data network protocols, and are capable of operating at a variety of different data rates. Some examples of such protocols include, but are not limited to, Gigabit Ethernet, and Fibre Channel. Exemplary data rates for some embodiments of the invention include, but are not limited to, 1/2/4 Gb/s Fibre Channel, and 1 Gb/s Ethernet.

Physical parameters—In one example implementation, discussed in further detail below in connection with FIGS. 2 through 4, the ONAS has a 2×8×2 configuration. Such a configuration refers to the fact that the ONAS has two (2) independent sides, sometimes also referred to as "banks," of eight (8) inputs each, where each side supports a pair of individually selectable outputs. More generally, some embodiments of the ONAS reflect an AxBxA configuration, where "A" refers to the number of independent sides, and to the number of associated selectable outputs, while "B" refers to the number of inputs associated with each side.

The scope of the invention is not limited to the aforementioned example configurations however, and the ONAS can generally be configured in any desired fashion. For example, one alternative embodiment of an ONAS may include only a single bank, while yet other embodiments may include three or more banks. Similarly, embodiments of the invention may include any number of duplex outputs. Thus, embodiments of the ONAS can be implemented with any desired number of sides, inputs and outputs.

Form factor—Embodiments of the ONAS can be implemented in accordance with any of a variety of different form factors. In one example implementation, the ONAS is ½ U wide×1 U high×6.5 inches deep (see FIG. 2). More generally however, the form factor may vary from one embodiment to another depending upon considerations such as the application(s) in which a particular ONAS will be employed.

Hardware interfaces—The type and number of hardware interfaces implemented in a particular ONAS may be selected as desired. In view of the wide applicability of the ONASs disclosed herein, the scope of the invention is not limited to any particular grouping of hardware interfaces, nor to any particular types of hardware interfaces. With the foregoing in view, one particular implementation of an ONAS includes the following hardware interfaces: (1) RJ45 10/100 Ethernet port; 850 nm|1310 nm|1550 nm dual optical LC inputs (2×8); (4) 850 nm dual optical LC outputs; (1) male US power connector; and, (1) RJ45 RS232 port. It should be noted with respect to the foregoing that the vertical lines employed in the notation "850 mm|1310 nm|1550 nm" constitute "exclusive OR" operators, meaning that the example dual optical LC inputs can operate, at any given time, at only one of the 850 nm, 1310 nm, and 1550 nm frequencies.

Software interfaces—As in the case of the hardware interfaces, the type and number of software interfaces implemented in a particular ONAS may vary. Thus, the scope of the invention is not limited to any particular grouping of software interfaces, nor to any particular types of software interfaces.

In some embodiments, the ONAS includes at least the following software interfaces: an Ethernet interface which provides the user with a channel for communication with the ONAS; an IP address reset facility for interoperation with a hardware interface such as an RS232 port; and, a configuration interface, particularly, a software application program interface ("API"), by way of which the user is able to securely reconfigure the ONAS—among other things, this configuration interface, which allows programs, such as NetWisdom and Xgig for example, to control the operation of the ONAS, enables the user to readily customize the ONAS configuration to suit a particular application or situation, such as by issuing one or more switching commands to connect/disconnect particular inputs with/from particular outputs.

Standards conformance—Exemplary embodiments of the ONAS conform to various applicable industrial electrical standards including, but not limited to, Xgig. Additionally, at least some implementations likewise conform with foreign standards Q such as European RoHS.

Environmental conditions—Implementations of the ONAS maintain in-spec performance over a predetermined range of operating temperatures. In some cases, the required operating temperature range is between about 0° C. and about 50° C. However, the design operating temperature range may be defined as desired. Additionally, embodiments of the ONAS are able to withstand a wide range of storage temperatures, from about −20° C. to about 70° C. in some cases. The range of storage temperatures may be defined as desired however.

Quality parameters—In general, the quality parameters employed in connection with the design and operation of an ONAS will vary, both in terms of the type and number of quality parameters employed, and in terms of the values or value ranges of those quality parameters. However, at least one implementation of the ONAS is configured to meet the bit error rate ("BER") requirements set forth in the Xgig specification.

Additionally, an exemplary ONAS is able to switch any bank input to any bank output within about 33 ms of receiving a valid switching command. Such switch may be indicated, by illumination of a lamp for example, within about 33 ms after the switch has occurred. In this example implementation, the maximum switching frequency is about 30 Hz. Other switch times and illumination times may alternatively be employed.

Another example of a quality parameter concerns the jitter imposed on a data signal as the data signal passes through the ONAS. In one example embodiment, the input-to-output jitter is less than about 23 picoseconds RMS jitter (about 10% bit width at 4 Gb/s) through two ONASs. This particular specification reflects the fact that multiple ONASs can be employed in a cascaded arrangement. Of course, any other jitter value and/or quality parameter may alternatively be specified and implemented.

Example configuration—As noted earlier, one example embodiment of the ONAS includes two independent banks of inputs and outputs, designated generally as a "top" bank and a "bottom" bank. The banks are configured so that the ONAS can implement independent multiplexing of the full-duplex input signals of an input bank to either of the full-duplex outputs associated with that particular input bank. In at least this embodiment, both outputs are able to concurrently output the same input signal. Embodiments of the ONAS are also configured to implement a default multiplex configuration at predetermined times, such as at start-up and/or upon occurrence of certain events, or passage of a predetermined period of time. For example, one embodiment of the ONAS is configured so that when initially powered up, and before receiving a configuration command, one or more predetermined inputs of the ONAS are connected with a predetermined output. The same default multiplex configuration can be used for both the top and bottom bank or, alternatively, each bank may default to a different respective multiplexing configuration.

In general then, the ONAS configuration can be automatically modified upon the detection and/or occurrence of a particular predefined event, or group of events, where such events include, but are not limited to, ONAS power-up, and the receipt of one or more switching commands. Of course, the ONAS configuration can be modified by a user at any time, as disclosed elsewhere herein, through the use of switching commands. Once the default, or other, configuration has been set, the ONAS will automatically assume that configuration upon power-up, or upon occurrence of a particular predefined event.

Status indicators—Embodiments of the ONAS include indicators, such as LEDs for example, that inform the user as to which inputs are multiplexed to which outputs. In one embodiment, the input bank indicators are color coordinated with the output indicators so that a user can quickly visually ascertain which input(s) is/are multiplexed to which output(s). Further details concerning this example embodiment are provided in the discussion of FIG. 4.

III. Aspects of the Example ONAS of FIGS. 2-4

Figure 2:
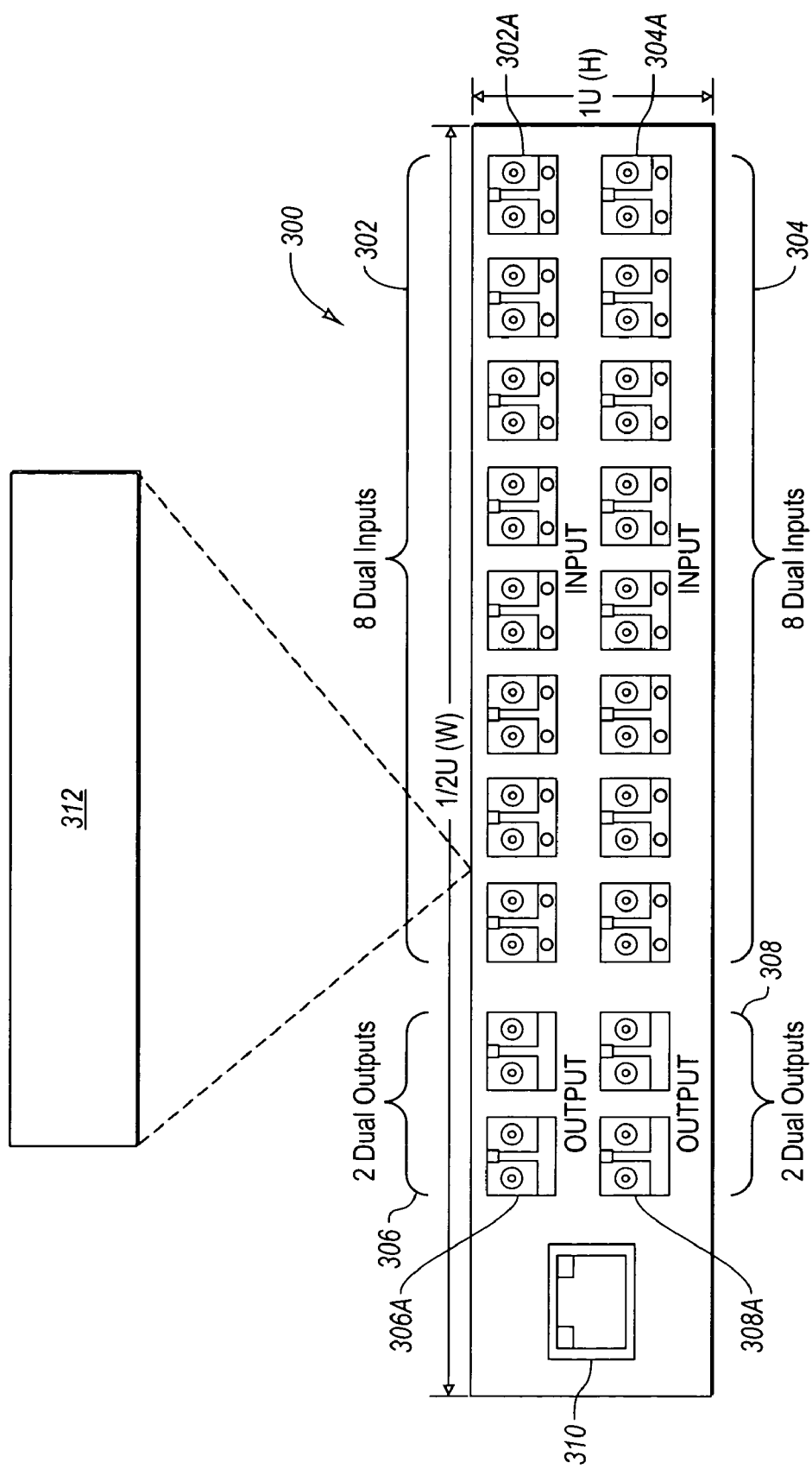
FIG. 2 is a schematic representation of an exemplary embodiment of an AxBxA ONAS, indicating the arrangement of various duplex input and output connections, and further indicating an exemplary hardware interface.
Figure 3:
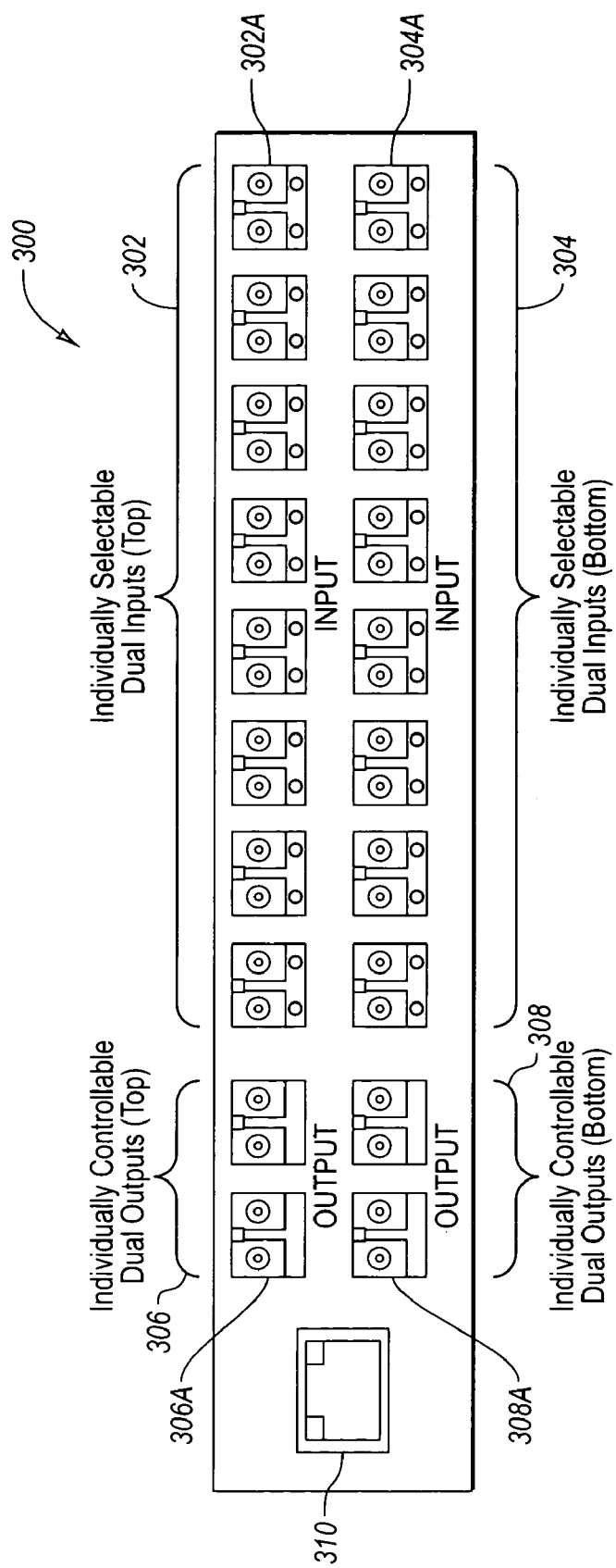
FIG. 3 is a schematic representation that provides further information concerning the AxBxA ONAS disclosed in FIG. 2.
Figure 4:
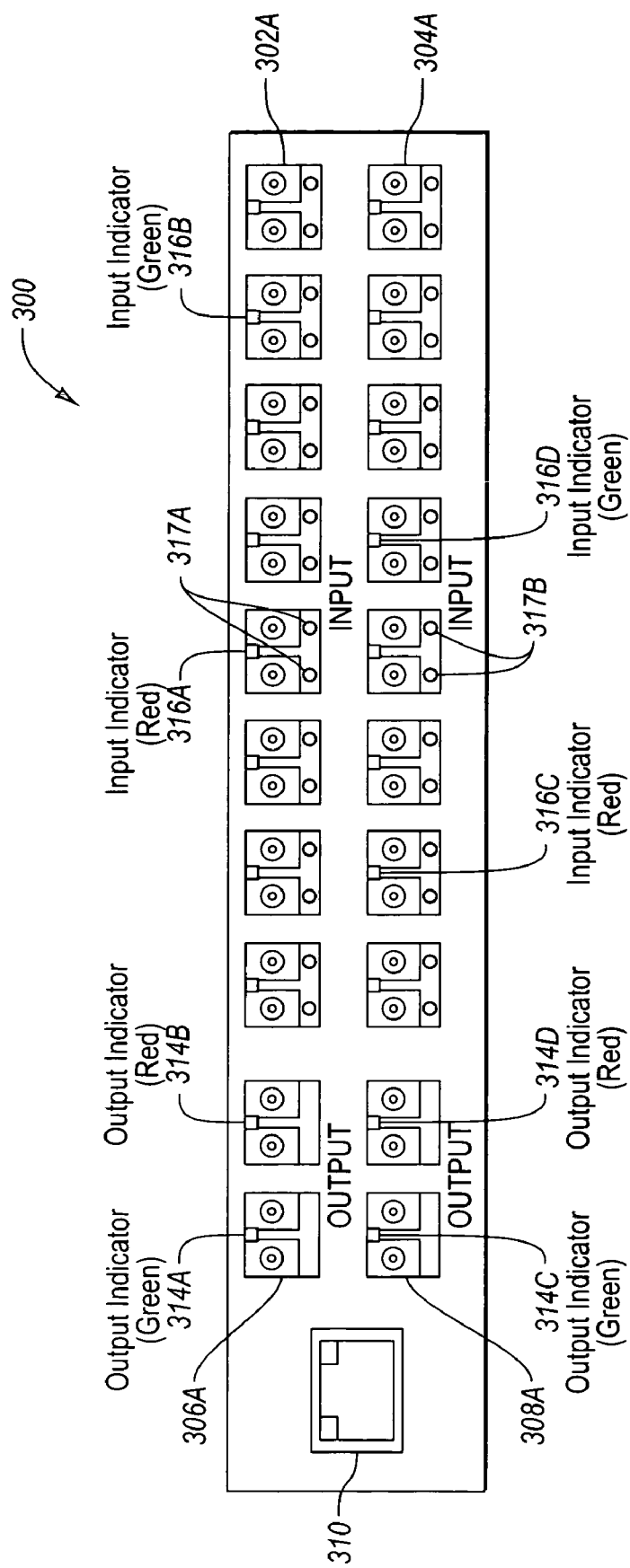
FIG. 4 is a schematic representation that discloses details concerning an indication scheme of an exemplary ONAS.

As indicated in FIGS. 2 through 4, one example of an ONAS 300 includes an upper bank 302 comprising 8 full-duplex inputs 302A, each of which is compatible with frequencies A|B|C nm, and a corresponding lower bank 304 comprising 8 full-duplex inputs 304A, each of which is compatible with frequencies A|B|C nm. In one example embodiment, A is 850 nm, B is 1310 nm and C is 1550 nm. Each bank 302 and 304 is configured and arranged to operate independently of the other. Other embodiments of an ONAS may include more, or fewer, banks and/or full-duplex inputs.

In the illustrated example, the upper bank 302 and lower bank 304 each have an associated group of dual outputs 306 and 308, respectively. Each of the groups 306 and 308 of dual outputs include two dual outputs 306A and 308A. Thus, the example disclosed arrangement gives rise to the "2×8×2" notation sometimes employed in connection with this particular embodiment. Of course, the type, number and arrangement of input/output connections may be varied as desired, and the 2×8×2 arrangement is just one example of the many arrangements that may be employed. Thus, the physical, electrical and/or optical relations between/among two or more ONAS connectors may take any desired form and arrangement.

As noted earlier herein, some embodiments of the ONAS are configured so that each bank has an associated multiplexer (see FIGS. 1, 1A and 1B). Thus, a user can multiplex any group of one or more input(s) of the bank to one or more of the outputs associated with that bank. The ONAS 300 disclosed in FIGS. 2 through 4 also includes a communication port 310, such as an RJ45 10/100 Ethernet port for example, by way of which the ONAS communicates with devices such as data stream monitors and analyzers.

It was noted in the discussion of the example ONAS above that each of the inputs is suited for operation with data signals reflecting a number of different frequencies, 850, 1310 and 1550 nm for example. More generally however, the number of different frequencies, and the particular values of those frequencies, with which a bank is compatible can be specified as desired and, accordingly, the scope of the invention is not limited to the aforementioned examples of 850|1310|1550 nm. It should also be noted that the number of different frequencies, and the particular values of those frequencies, with which a particular bank is compatible can vary from one bank to another. Thus, upper bank 302 may, for example, be compatible with A|B|C nm, while lower bank 304 may be compatible, for example, with D|E|F|G nm.

As suggested by the foregoing discussion, embodiments of the ONAS also incorporate a wavelength conversion functionality. In particular, embodiments of the ONAS also include a wavelength converter 312 (FIG. 2) so that regardless of the wavelength of the data signals received at the ONAS inputs, the optical signals output by the ONAS will all have substantially the same wavelength.

In one example embodiment, the ONAS receives optical data signals of the frequencies 850|1310|1550 nm. The received signals are directed to the wavelength converter 312 and the wavelengths of these signals are then converted to a uniform wavelength, such as 850 nm for example, before being output from the ONAS. Thus, the various devices to which the output signals are directed, examples of which include analyzers and monitors, need only be compatible with a single optical wavelength. In this way, the expense and complexity of the system can be reduced, since only a single set of monitoring and analysis equipment is required.

With further attention now to the outputs of the ONAS 300, each of the dual outputs 306A and 308A is configured to be individually controllable. For example, the output from one of the dual outputs 306A can be directed to one destination, while the output from the other dual output 306A can be directed to a different destination. The same is true for the dual outputs 308A. Another aspect of the dual outputs is that, at any given time, a dual output can select one or more inputs and then output the information that is received at the selected input(s). The functionality of these example dual outputs is useful in a variety of situations.

As an example, if a problem is detected on a particular link, the data stream from that link can be directed by one of the dual outputs 306A to an analyzer, monitor or other equipment. That equipment can then remain in communication with the problem link so that the problem(s) can be diagnosed and appropriate action taken. At the same time, data from the other links can be directed by the other dual output port 306A to monitoring equipment. Thus, a problem on one link does not compromise the ability of the ONAS 300 to continue to facilitate monitoring of other links. Among other things then, the individually controllable outputs of the ONAS 300 enable the simultaneous performance of both troubleshooting operations and monitoring operations (see, e.g., FIGS. 5 and 7).

As discussed above, one aspect of example ONASs is that the inputs and outputs of the ONAS can be connected with each other in any of a variety of different arrangements. Consistently, embodiments of the ONAS are configured with an indication scheme which, among other things, enables a user to quickly determine which input(s) is/are connected to which output(s). Directing attention now to FIG. 4, and with continuing attention to FIGS. 2 and 3, details are provided concerning one example of such an indication scheme.

In general, the example indication scheme disclosed in FIG. 4 provides status as to which inputs and outputs are currently selected and, further, the specific input/output to which each output/input, respectively, is connected, if any. In addition, the aforementioned example indication scheme provides visual indication as to whether or not the two sides of a particular input port are each receiving sufficient optical energy to support fiber optic operations. This information enables an operator to take any necessary remedial actions.

In one example embodiment, the indication scheme is implemented through the use of visual indication devices, such as colored light emitting diodes ("LED") for example. However, any other indication scheme of comparable functionality may alternatively be employed. In the illustrated example, the status of the ONAS 300 output connections is signified through the use of red indicators and green indicators, denoted collectively at 314.

Particularly, each dual output 306A has an associated colored LED that visually differentiates that output from any adjacent output, so that the left dual output 306A and right dual output 306A are visibly distinguishable from each other. In this example, the upper left dual output 306A is associated with a green output indicator 314A and the upper right dual output 306A is associated with a red output indicator 314B. In similar fashion, the lower left dual output 306A is associated with a green output indicator 314C and the lower right dual output 306A is associated with a red output indicator 314D. In this example embodiment then, the output indicators for the top and bottom outputs can be the same color for each side, but cannot have different colors for top-left and bottom-left outputs, and top-right and bottom-right outputs.

Consistent with the foregoing indication scheme for the ONAS 300 dual outputs, each of the ONAS 300 dual inputs 302 and 304 likewise includes an input indicator that provides information concerning whether or not the input is selected for connection with an output, and the output(s), if any, to which the input is connected. In the example disclosed in FIG. 4, each input indicator, collectively denoted at 316, is implemented as a bi-colored LED that remains extinguished until the associated input is selected for connection with one or more associated output(s) of the bank in which the input is included.

Using the top bank as an example, an input 302A is connected to the right output 306A of the top bank. Accordingly, the indicator 316A for that input 302A will be lit the same color, namely, red, as the indicator 314B for the top right output 306A to which that input 302A is connected. Similarly, another input 302A is connected to the left output 306A of the top bank. Thus, the indicator 316B for that input 302A will be lit the same color, namely, green, as the indicator 314A for the top left output 306A to which that input 302A is connected.

With attention now to the bottom bank disclosed in FIG. 4, an indication scheme similar to that discussed above is employed. Particularly, the indicator 316C for the input 304A will be lit the same color, namely, red, as the indicator 314D for the bottom right output 308A to which that input 304A is connected. Similarly, another input 304A is connected to the left output 308A of the bottom bank. Thus, the indicator 316D for that input 304A will be lit the same color, namely, green, as the indicator 314C for the bottom left output 308A to which that input 302A is connected.

It was noted elsewhere herein that an input, or inputs, can be connected with both outputs of the bank within which the input is included. In such a case, the indicator associated with that input is strobed with the colors of both outputs. Among other things, this functionality enables a user to rapidly make a visual determination that a particular input is connected with both outputs. In one example embodiment, the strobe has an associated duty cycle greater than about 30 Hz. More generally, other duty cycles, indication schemes, and/or indicators of comparable functionality may alternatively be employed.

With continuing reference to FIGS. 2 through 4, an additional set of visual indicators, denoted collectively at 317, are included. As disclosed in FIG. 4, the visual indicators associated with the upper bank 302 are denoted at 317A, while the visual indicators associated with the lower bank 304 are denoted 317B. The visual indicators 317 may comprise LEDs, or any other suitable indicator. Since each input port 302A/304A is a dual input port, in the illustrated embodiment, each input port 302A/304A includes a pair of respective indicators 317A/317B, where each indicator of an indicator pair corresponds with one "half" or side of the input port with which that pair is associated.

As noted earlier herein, the visual indicators 317 provide visual indication to an operator or user as to whether or not the sides of each input port are receiving sufficient optical energy to implement fiber optic operations. Particularly, when a port half is receiving sufficient optical energy that fiber optic operations can be performed in connection with that port half, the indicator 317A or 317B associated with that port half is lit. If a port half is not receiving adequate optical energy to support fiber optic a operations, the indicator 317A or 317B associated with that port half is extinguished.

Among other things, the use of visual indicators 317 enables an operator to quickly determine whether or not a particular port half is receiving adequate optical energy to support fiber optic operations. Once such a determination is made, the operator can then take appropriate remedial action.

Figure 5:
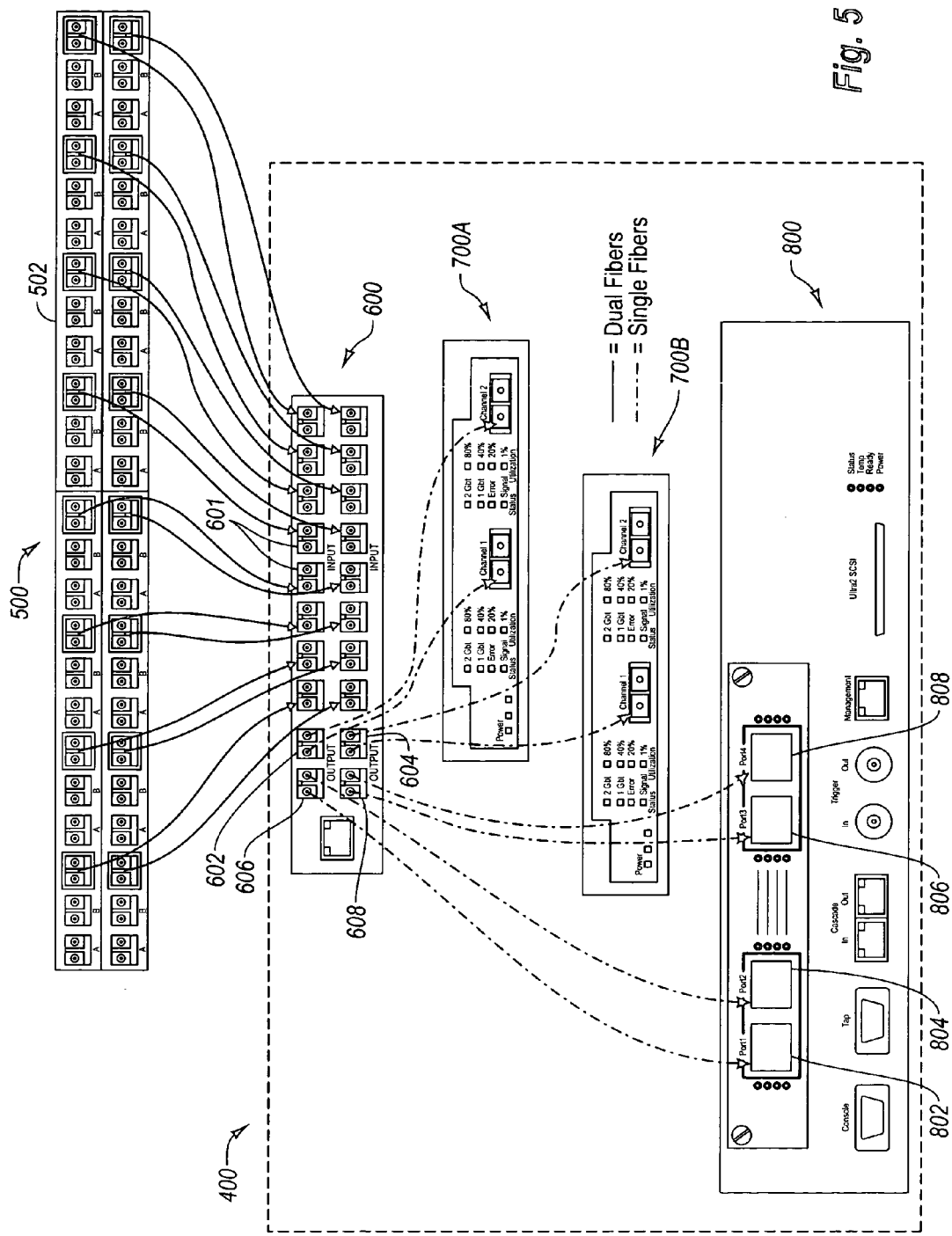
FIG. 5 is a schematic representation of one example of a network monitoring and analysis setup, and provides details concerning a corresponding connection scheme.
Figure 6:
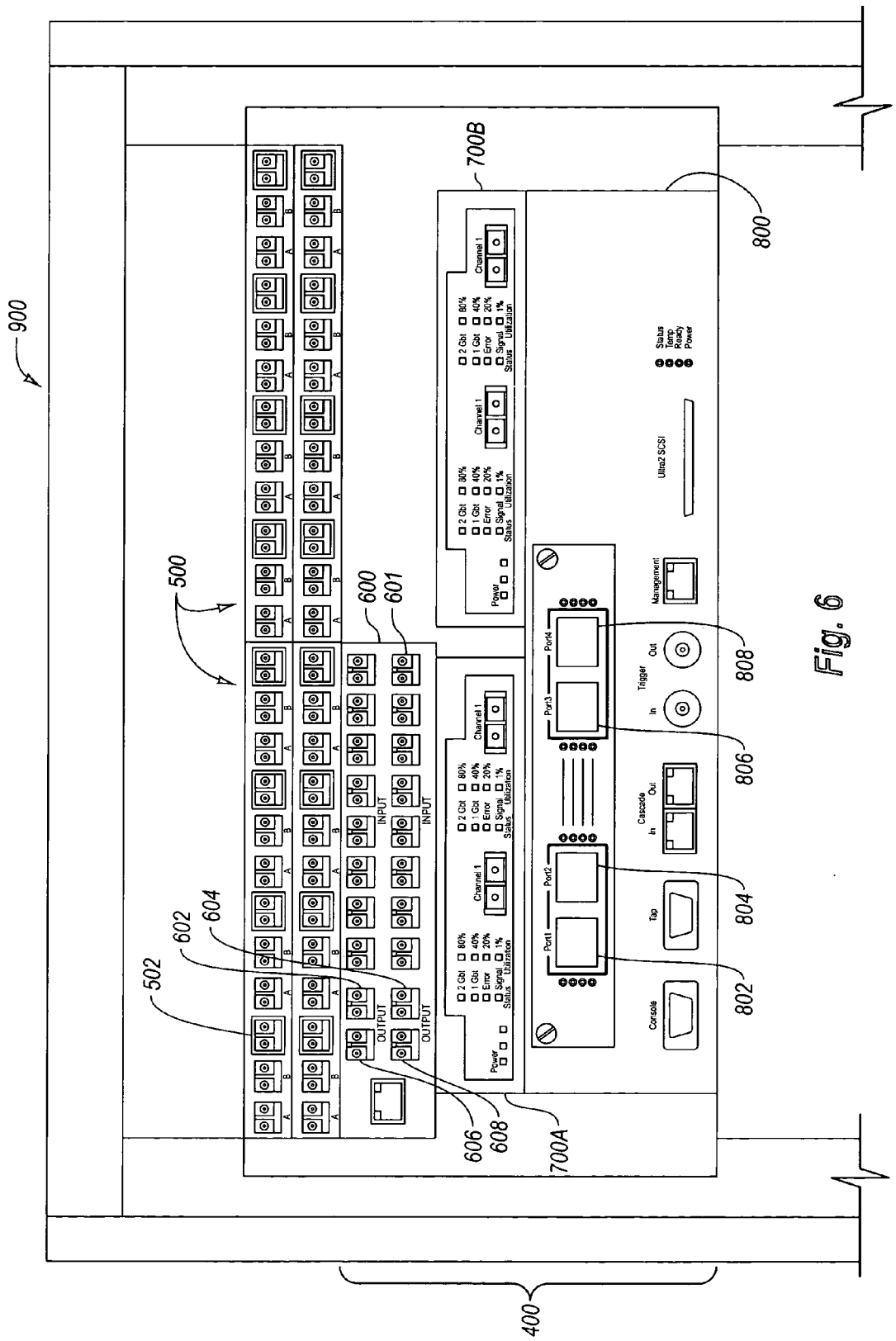
FIG. 6 is a schematic representation of the network monitoring and analysis setup of FIG. 5 positioned in an equipment rack.

IV. Example Application of an ONAS (FIGS. 5-6)

As disclosed herein, embodiments of the ONAS can be employed in a variety of different applications. Aspects of one example application are disclosed in FIGS. 5 and 6. In the example of FIGS. 5 and 6, an example of a monitoring and analysis ("M-A") setup 400 is illustrated. In general, the M-A setup 400 is configured and arranged to facilitate monitoring and analysis of multiple network ports. The monitored network may be a SAN, or any other type of network.

In the illustrated example, the M-A setup 400 is configured to communicate with a high density TAP arrangement 500 that includes four (4) quad test access point ("TAP") modules. Each TAP module is, in turn, connected with 4 ports of the network that is to be monitored. The TAP module outputs, sixteen in this example, are individually denoted at 502. Generally, the TAP modules of the high density TAP arrangement 500 access the network data signals and provide a copy of the data signals as unidirectional TAP traffic through the TAP module outputs 502 (see, e.g., FIG. 1).

The M-A setup 400 with which the high density TAP arrangement 500 communicates includes an ONAS 600 that receives the unidirectional TAP traffic from the high density TAP arrangement 500 and outputs that traffic to monitors, analyzers and/or other devices. Particularly, the M-A setup 400 further includes a pair of monitors 700A and 700B, each of which is configured to receive output signals from the ONAS 600. In the illustrated example, the ONAS 600 also directs output signals to an analyzer 800. Among other things then, the illustrated M-A setup 400 implements monitoring of a first group of one or more ports, while simultaneously analyzing another port or group of ports.

As indicated in FIG. 5, dual fiber cables are used to connect each of the 16 TAP outputs 502 to a corresponding ONAS input, each denoted at 601, as shown. A first ONAS output 602 is connected to the monitor 700A, and a second ONAS output 604 is connected to the monitor 700B. The connections between the ONAS outputs 602 and 604 and the first and second monitors 700A and 700B, respectively, are implemented with single fiber cables since, in this example, the inputs of the monitors 700A and 700B are each half duplex.

As further indicated in FIG. 5, each of the third and fourth ONAS dual outputs 606 and 608 is connected with a pair of input ports of the analyzer 800, namely, input ports 802/804, and input ports 806/808, respectively. These connections are implemented with single fiber cables since, in this example, the inputs of the analyzer 800 are half duplex. In sum, the example arrangement indicated in FIG. 5 employs a total of 16 dual fiber cables, and 8 single fiber cables. As indicated in FIG. 6, the example arrangement of components of FIG. 5 can be situated in a 42 U standard equipment rack 900. However, other rack types and configurations may alternatively be employed.

V. Cascaded ONAS Configuration (FIGS. 7-8)

It was noted elsewhere herein that in some applications, multiple ONASs may be employed in a cascaded arrangement. Among other things, the implementation and use of such cascaded arrangements results in a relative increase in the number of ports among which an analyzer can rove. Some aspects of one example of such a cascaded arrangement are indicated in FIGS. 7 and 8.

In general, the number of network ports monitored or analyzed by way of an ONAS is scalable. Thus, in the illustrated example, a cascaded ONAS arrangement is employed that is able to monitor and/or analyze two dual links across a total of 64 TAP ports (not shown). More particularly, the analyzer can switch the input from the cascade ONAS and any of the four input ONASs to implement analysis from any of the 64 ports. As in the case of other embodiments of M-A setups disclosed herein, the M-A setup 1000 is capable of implementing simultaneous monitoring and analysis processes.

Figure 7:
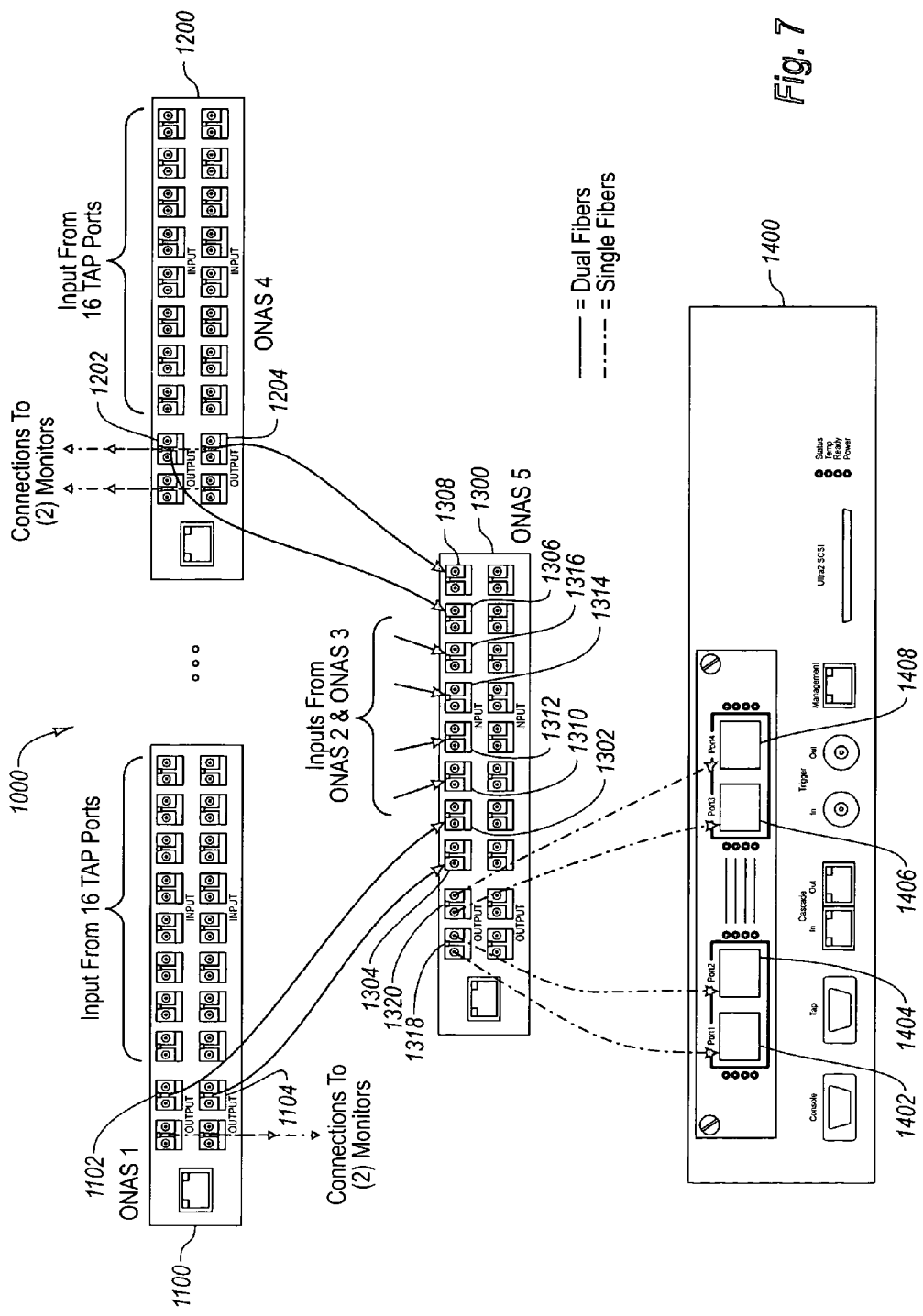
FIG. 7 is a schematic representation of another example of a network monitoring and analysis setup, and provides details concerning a corresponding connection scheme.
Figure 8:
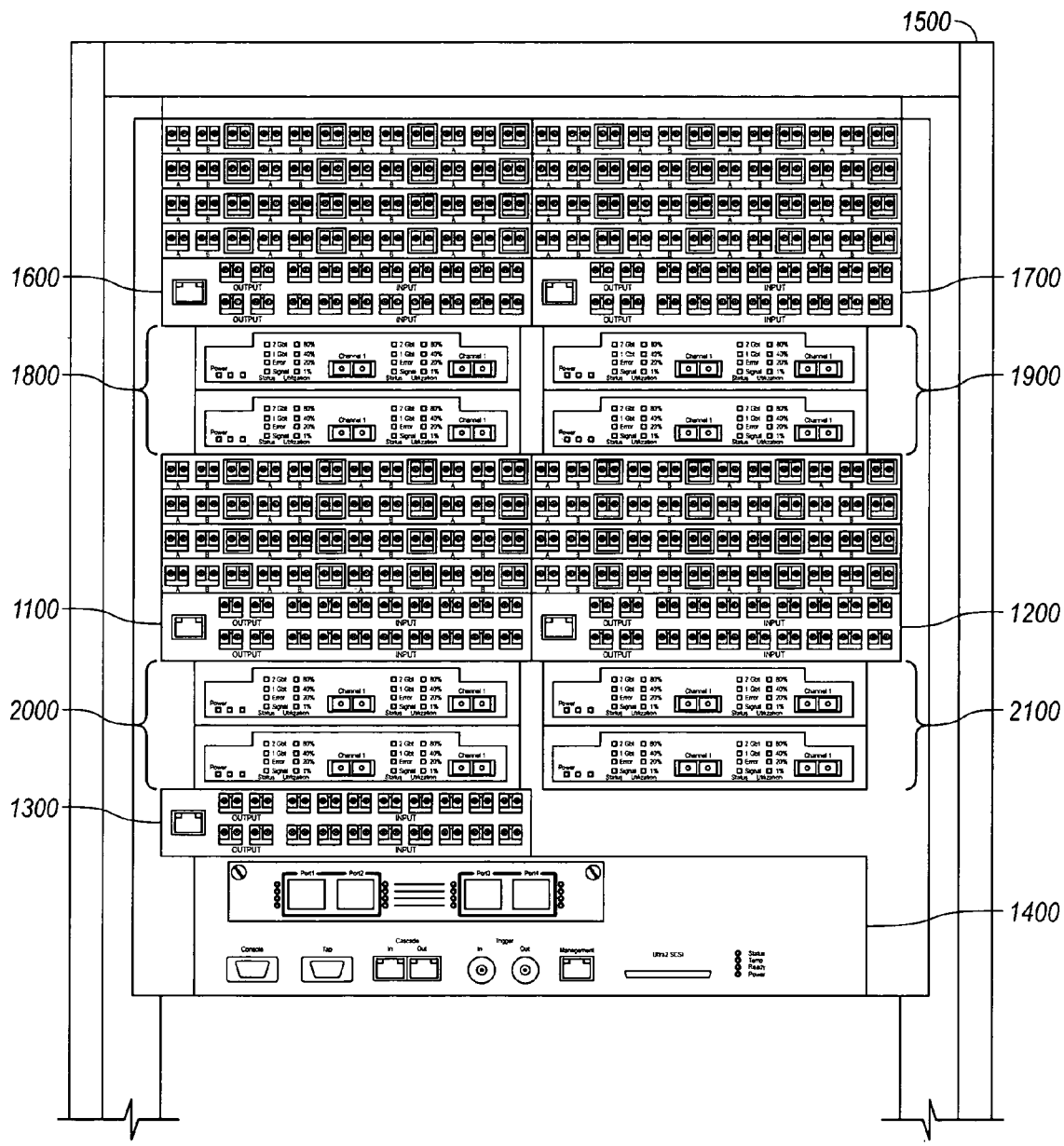
FIG. 8 is a schematic representation of the network monitoring and analysis setup of FIG. 7 positioned in an equipment rack.

With more particular reference now to FIGS. 7 and 8, an alternative embodiment of an M-A setup, denoted generally at 1000, is disclosed. In general, the M-A setup 1000 is configured and arranged to facilitate monitoring and analysis of multiple network ports. The monitored network may be a SAN, or any other type of network.

In the illustrated example, the M-A setup 1000 is configured to communicate with a high density TAP arrangement (not shown) that includes thirty two (32) unidirectional data outputs. To this end, the M-A setup 1000 includes five ONASs, only three of which are illustrated in FIG. 7 (see FIG. 8 for the two remaining ONASs). Specifically, ONAS1 1100, ONAS4 1200, and ONAS5 1300 are illustrated. ONAS5 1300 may also be referred to as a "cascade ONAS" or "cascading ONAS."

Referring first to ONAS1 1100, unidirectional TAP traffic is received from up to sixteen (16) network TAPs at ONAS1 1100, and signals from a pair of outputs 1102 and 1104 of ONAS1 1100 are directed to corresponding inputs 1302 and 1304 of cascade ONAS5 1300. Similarly, signals from a pair of outputs 1202 and 1204 of ONAS4 1200 are directed to corresponding inputs 1306 and 1308 of cascade ONAS5 1300. Finally, ONAS5 1300 receives, at inputs 1310 and 1312, input from ONAS2, and cascade ONAS5 1300 also receives, at inputs 1314 and 1316, inputs from ONAS3. As a result of this example arrangement, the cascade ONAS5 1300 is able to aggregate the outputs of four other ONASs so that those outputs can be roved by an analyzer, as discussed below. Of course, the underlying cascade concept exemplified in FIG. 7 can be extended without limit to greater numbers of ONASs, monitors and analyzers and the scope of the invention should, accordingly, not be construed to be limited to the example arrangements disclosed herein.

As indicated in FIG. 7, the connections between ONASs are dual connections. In addition to directing output signals to cascade ONAS5 1300, the ONAS1 1100 and ONAS4 1200 also each direct output signals to a corresponding pair of monitors (see FIG. 8). The connections between ONAS1 1100 and ONAS4 1200, and their corresponding sets of monitors, are half duplex connections. In this example, each such monitor is thus able to rove across eight (8) ports.

As well, ONAS5 1300 transmits, from output connections 1318 and 1320, two sets of outputs to analyzer 1400. Specifically, output connections 1318 are connected with input ports 1402 and 1404 of analyzer 1400, while output connections 1320 are connected with input ports 1406 and 1408 of analyzer 1400. As indicated in FIG. 7, the connections between ports ONAS5 1300 and analyzer 1400 are half duplex connections.

Finally, and as indicated in FIG. 8, the example 13 U arrangement of components of FIG. 7 can be situated in a 42 U standard equipment rack 1500. However, other rack types and configurations may alternatively be employed. Additionally, FIG. 8 also illustrates a number of components not shown in FIG. 7, particularly, ONAS2 1600 and ONAS3 1700, as well as monitor pair 1800 connected with ONAS2 1600, monitor pair 1900 connected with ONAS3 1700, monitor pair 2000 connected with ONAS1 1100, and monitor pair 210A0 connected with ONAS4 1200. The connections between the aforementioned monitor pairs and respective ONASs are half duplex connections.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical network access switch, comprising:
    first and second banks of individually selectable optical inputs, the first and second banks being independent of each other;
    first and second groups of individually controllable optical outputs, the first and second groups being independent of each other;

first and second multiplexers, the first multiplexer being connected to the optical inputs of the first bank and the optical outputs of the first group, and the second multiplexer being connected to the optical inputs of the second bank and the optical outputs of the second group;

a configuration interface in communication with the first and second multiplexers and configured to receive a switching command, where the switching command specifies at least one of: connection of a particular optical input to a particular optical output; and, disconnection of a particular optical input from a particular optical output;

a plurality of optical input indicators, each of which is associated with a respective optical input, and each optical input indicator being configured to provide information regarding:

whether or not the respective optical input is connected to an optical output; and the optical output to which the respective optical input is connected, if any;

a plurality of optical output indicators, each of which is associated with a respective optical output, and each optical output indicator being configured to provide information regarding whether or not any optical inputs are connected to the respective optical output; and a plurality of optical input indicator pairs, each indicator in a pair being associated with a respective half of an optical input with which the pair is associated, and each indicator in the pair configured to provide information regarding any optical power received at the respective half of the optical input.

2. The optical network access switch as recited in claim 1, wherein the optical inputs and optical outputs comprise dual connections.

3. The optical network access switch as recited in claim 1, wherein signals from respective outputs of a group of individually controllable optical outputs are directable to different respective destinations.

4. The optical network access switch as recited in claim 1, wherein each optical input is configured to receive optical signals of various wavelengths.

5. The optical network access switch as recited in claim 1, wherein optical signals transmitted from the optical outputs of a group each have substantially the same wavelength, while optical signals received at the bank associated with that group have different respective wavelengths.

6. The optical network access switch as recited in claim 1, further comprising:

a plurality of hardware interfaces, each of which is configured for communication with at least one component of the optical network access switch, and the plurality of hardware interfaces comprising:
a 10/100 Ethernet port;
a US power connector; and
an RJ45 RS232 port; and a plurality of software interfaces, each of which is configured for communication with at least one component of the optical network access switch, and the plurality of software interfaces comprising:
an Ethernet interface; and
an IP address reset interface.

7. The optical network access switch as recited in claim 1, wherein the optical network access switch is compatible with the following protocols and nominal data rates:
1/2/4 Gb/s Fibre Channel; and
1 Gb/s Ethernet.

8. The optical network access switch as recited in claim 1, wherein the optical network access switch is cascadable with one or more optical network access switches.

9. The optical network access switch as recited in claim 1, wherein the optical network access switch is configured to perform signal retiming.

10. An optical network access switch, comprising:
a bank of individually selectable dual optical inputs;
a group of individually controllable dual optical outputs;
a plurality of receiver modules, each of which communicates with a respective dual optical input, and each receiver module comprising:
a first optical receiver in communication with a first side of the respective dual optical input; and
a second optical receiver in communication with a second side of the respective dual optical input;
a plurality of transmitter modules, each of which communicates with a respective dual optical output, and each transmitter module comprising:
a first optical transmitter in communication with a first side of the respective dual optical output; and
a second optical transmitter in communication with a second side of the respective dual optical output;
a multiplexer in communication with the transmitter modules and receiver modules;
a plurality of optical input indicators, each of which is associated with a respective optical input, and each optical input indicator being configured to provide information regarding:
whether or not the respective optical input is connected to an optical output; and
the optical output to which the respective optical input is connected, if any; and
a plurality of optical output indicators, each of which is associated with a respective optical output, and each optical output indicator being configured to provide information regarding whether or not any optical inputs are connected to the respective optical output; and
a plurality of optical input indicator pairs, each indicator in a pair being associated with a respective half of an optical input with which the pair is associated, and each indicator in the pair configured to provide information regarding any optical power received at the respective half of the optical input.

11. The optical network access switch as recited in claim 10, wherein the transmitter and receiver modules substantially comply with the small form-factor (SFF) standard.

12. The optical network access switch as recited in claim 10, wherein the optical network access switch is cascadable with one or more optical network access switches.

13. The optical network access switch as recited in claim 10, wherein signals from respective outputs of a group of individually controllable optical outputs are directable to different respective destinations.

14. The optical network access switch as recited in claim 10, wherein each optical input is configured to receive optical signals of various wavelengths.

15. The optical network access switch as recited in claim 10, wherein the optical network access switch is compatible with the following protocols and nominal data rates:
1/2/4 Gb/s Fibre Channel; and
1 Gb/s Ethernet.

16. An optical network access switch, comprising:
first and second banks of individually selectable optical inputs, the first and second banks being independent of each other;

first and second groups of individually controllable optical outputs, the first and second groups being independent of each other;

a wavelength converter in communication with one of the optical inputs and the optical outputs;

first and second multiplexers, the first multiplexer being connected to the optical inputs of the first bank and the optical outputs of the first group, and the second multiplexer being connected to the optical inputs of the second bank and the optical outputs of the second group;

a configuration interface in communication with the first and second multiplexers and configured to receive a switching command, where the switching command specifies at least one of: connection of a particular optical input to a particular optical output; and, disconnection of a particular optical input from a particular optical output;

a plurality of optical input indicators, each of which is associated with a respective optical input, and each optical input indicator being configured to provide information regarding:

whether or not the respective optical input is connected to an optical output; and the optical output to which the respective optical input is connected, if any; and a plurality of optical output indicators, each of which is associated with a respective optical output, and each optical output indicator being configured to provide information regarding whether or not any optical inputs are connected to the respective optical output; and a plurality of optical input indicator pairs, each indicator in a pair being associated with a respective half of an optical input with which the pair is associated, and each indicator in the pair configured to provide information regarding any optical power received at the respective half of the optical input.

17. The optical network access switch as recited in claim 16, wherein signals from respective outputs of a group of individually controllable optical outputs are directable to different respective destinations.

18. The optical network access switch as recited in claim 16, wherein each optical input is configured to receive optical signals of various wavelengths.

19. The optical network access switch as recited in claim 16, wherein the optical network access switch is compatible with the following protocols and nominal data rates:

1/2/4 Gb/s Fibre Channel; and

1 Gb/s Ethernet.

20. The optical network access switch as recited in claim 16, wherein the optical network access switch is cascadable with one or more optical network access switches.

* * * * *

UNITED STATES PATENT AND TRADEMARK OFFICE
CERTIFICATE OF CORRECTION

PATENT NO.        : 7,602,772 B2
APPLICATION NO. : 11/290496
DATED             : October 13, 2009
INVENTOR(S)       : Cicchetti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 810 days.

Signed and Sealed this

Fifth Day of October, 2010

David J. Kappos
*Director of the United States Patent and Trademark Office*